United States Patent [19]

Hermann

[11] 3,965,519
[45] June 29, 1976

[54] DISPOSABLE FLOOR POLISHING WIPE

[75] Inventor: James F. Hermann, Racine, Wis.

[73] Assignee: S. C. Johnson & Son, Inc., Racine, Wis.

[22] Filed: July 8, 1974

[21] Appl. No.: 486,323

[52] U.S. Cl. ................ 15/104.93; 15/209 R; 206/205; 206/812; 428/195; 428/196; 428/198; 428/211; 428/212; 428/219

[51] Int. Cl.² ................ A47L 13/17; B65D 85/70

[58] Field of Search ............. 15/104.93, 209 R; 161/129, 146; 117/154; 206/205, 812; 428/219, 198, 212, 211, 195, 196, 290, 291

[56] References Cited
UNITED STATES PATENTS

| | | | |
|---|---|---|---|
| 1,852,114 | 4/1932 | Green | 15/104.93 |
| 2,999,265 | 9/1961 | Duane et al. | 15/104.93 |
| 3,047,445 | 7/1962 | Gresham | 161/129 |
| 3,200,036 | 8/1965 | Greenblatt | 15/104.93 |
| 3,308,078 | 3/1967 | Rogers et al. | 15/104.93 |
| 3,320,196 | 5/1967 | Rogers | 117/154 |
| 3,448,478 | 6/1969 | Nash et al. | 15/104.93 |
| 3,477,084 | 11/1969 | Thomas | 161/129 |
| 3,530,030 | 9/1970 | Adams | 15/104.93 |
| 3,619,280 | 11/1971 | Scheuer | 15/104.93 |
| 3,818,533 | 6/1974 | Scheuer | 15/104.93 |
| 3,846,158 | 11/1974 | Vasilyadis | 428/211 |

Primary Examiner—J.C. Cannon

[57] ABSTRACT

A disposable floor wipe for use in cleaning and shining linoleum, asphalt tile, vinyl and other similar floor surfaces comprises a carrier substrate which is substantially compressible, having a basis weight of at least 40 g/m² and having a relatively high liquid capacity, this substrate impregnated with a floor coating composition at a weight ratio of 3:1 to 6.5:1.

15 Claims, 4 Drawing Figures

DISPOSABLE FLOOR POLISHING WIPE

This invention relates to a disposable floor wipe product. More particularly, this invention relates to a disposable product for use in cleaning and shining linoleum, asphalt tile, vinyl and other similar floor surfaces. Conventional methods of cleaning and shining or waxing floors are well-known and are adequate for regular maintenance. However, these methods are laborious and time-consuming. There have been efforts to develop a convenience product which will clean the floors and impart a durable shiny finish. The present invention is directed to a floor product designed for one-time use and comprises a non-woven substrate having a high capacity impregnated with a floor coating composition.

The concept of impregnating various paper and non-woven materials for one-time use as wiping cloths is well-known. A number of these materials have been disclosed for use as wiping cloths for furniture, as so-called dusting and polishing cloths, or for use as one-time washing cloths, or one-time disinfecting wipes.

However, prior to the present invention there have been no successful application of the one-time disposable wipe concept to floor care. This is because a number of compromises or problems must be overcome before a suitable floor care product can be dispensed from a disposable wipe. Prior types of furniture wipe also disclosed as floor wipes are found in U.S. Pat. Nos. 1,852,114, 3,200,036, and 3,619,251.

As contrasted with furniture dusting and polishing cloths which contain a small amount of hydrocarbon oils, glycols and other materials, including waxes and silicones, relative to the weight of the substrate wipe, in order to achieve a satisfactory product for floor care use, the amount of floor coating composition impregnated onto the wipe must be sufficient so as to cover a reasonably large area, i.e., 40 to 50 sq. ft. Furthermore, while this material must be present in quantities sufficient to coat a reasonably large area, the combination of the wipe substrate and the coating material must be such that there is reasonably effective metering of the material from the wipe substrate to the floor so that a substantially even film is produced. Most prior art compositions and wipe substrates combined in the amounts as set forth in the prior art have not been able to achieve this metering aspect of the product of the present invention, and either were not able to deliver sufficient coating composition to the floor substrate for commercial acceptance, or, if theoretically containing sufficient coating material to cover a large area, did not meter this material sufficiently and, accordingly, left an uneven finish on the floor.

The product of the present invention overcomes these difficulties and has made available for the first time a one-use product for shining floors which enables the user to cover a reasonably large area with a relatively even film over this entire area using a single disposable wipe. This has been accomplished by utilizing certain disposable non-woven absorbent materials in combination with various floor care coating compositions at specific load ratios, i.e., the weight ratio of coating material impregnated to the weight of cloth so that the coating material is effectively metered from the substrate onto the floor as a substantially even and level film.

Accordingly, it is the primary object of the present invention to provide a disposable floor care product which provides an even shine on the floor while at the same time cleans the floor.

It is a further object of the present invention to provide a disposable floor care product wherein the floor coating composition is effectively metered from the substrate wipe at a relatively constant rate.

It is a still further object of the present invention to provide a quick and convenient floor care product designed both for in between touch-up use and total floor care.

Still further objects and advantages of the article of the present invention will become more apparent from the following more detailed description thereof and the attached drawings wherein.

Figure 1:
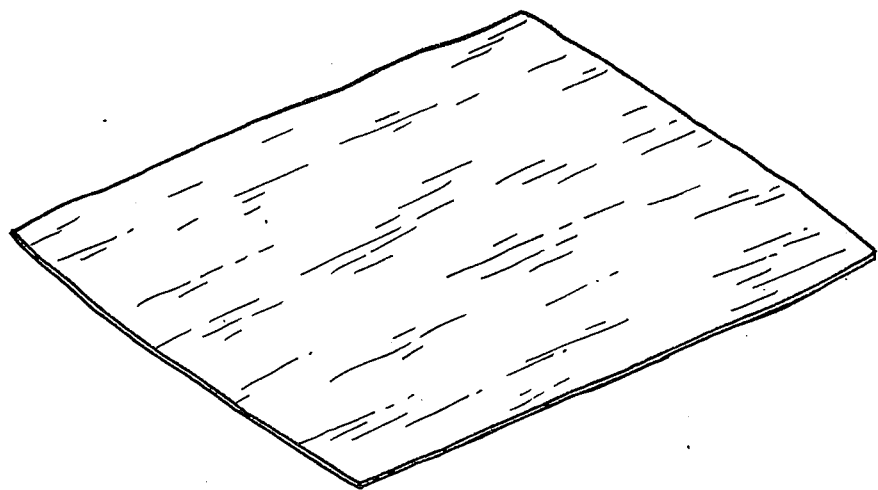
FIG. 1 is a perspective view of an improved wipe according to the present invention.

The floor wipes of the present invention comprise a non-woven substrate, which is substantially compressible, having a basis weight of at least 40 $g/m^2$ and having an absorbant capacity of at least 4:1, this towel being impregnated with an aqueous self-polishing, floor-coating composition, said composition being selected from solution systems, alkali-soluble systems and emulsion systems, said coating composition being impregnated into said non-woven substrate in a weight ratio of coating composition to substrate of from about 3.0:1 to 6.5:1.

As utilized in the instant specification and claims, the term "capacity" or "absorbant capacity" refers the amount of liquid absorbed by a test strip of material after 10 minutes immersion in the liquid expressed as a ratio of liquid absorbed to substrate weight.

The term "loading" is defined as the ratio of weight of floor coating composition impregnated per weight of substrate.

The term "substantially compressible" means that degree of compressibility typically imparted to a non-woven substrate by mechanical or chemical debonding techniques such as creping, needling, chemical debonding and the like to produce a bulkier, more absorbant structure.

Substrates which may be utilized in the floor care wipe of the present invention may be generally characterized as substantially compressible non-woven fibrous sheet materials having a capacity to absorb from 4 to 10 times its weight of water, i.e., 4:1 to 10:1. These substrates also should have a basis weight of at least between 40 $g/m^2$ and preferably between about 40 and 190 $g/m^2$ and most preferably between 65 and 130 $g/m^2$. Also, it is desirable, and in fact a preferred embodiment of the present invention, to utilize non-woven substrates which are further characterized as having a high loft. A further desirable characteristic of some substrates suitable for use is a nylon, rayon or polypropylene scrim reinforcement for added strength during use. Also, non-woven substrates with randomly laid thermoplastic reinforcing fibers are suitable.

The non-woven substrates of the present invention must have sufficient capacity and absorptive characteristics so as to be capable of absorbing from 4 to 10 times the weight of the non-woven substrate of water. It is within this range of capacity that the substrates possess sufficient holding properties so as to enable sufficient floor coating composition to be impregnated in the substrate for covering a reasonable surface area. At capacities less than 4 times, in order to coat a sufficient area, the size of the floor care wipes which must be utilized becomes difficult and in fact impossible to handle efficiently, thereby causing uneven coating of the floor and waste of product. Conversely, at capacities of greater than 10 times, the substrate itself retains a larger amount of coating product by capillary action and accordingly, although more coating material may be impregnated into a non-woven the same size as a less absorbant non-woven, a larger percentage of this added coating material is retained in the non-woven and is not delivered onto the floor surface.

In addition to the liquid capacity of the substrates, it is most important that the substrates be substantially compressible. The relative compressibility of the substrate is most important since this property plus the liquid capacity control the metering effect of the wipes of the present invention. If the substrate is not particularly compressible, the liquids absorbed therein will be exuded at too great a rate for proper utility and also subject to great variations in application rate due to small changes in applied pressure.

The basis rate of the type of non-woven substrates of the present invention is also important to the performance of the floor care wipes of the present invention since at weights below the limit on the basis weight, i.e., below 40 g/m$^2$, performance properties are significantly reduced. Furthermore, performance characteristics are enhanced if the basis weight of the substrate is within the preferred ranges, i.e., 40 to 190 g/m$^2$ and 65 to 130 g/m$^2$.

By combining the proper basis weight with capacity and compressibility of the non-woven substrate utilized in the wipes of the present invention, a desirable metering effect not heretofore obtainable can be achieved which enables the user to coat a relatively large surface area with a substantially uniform thin coating of floor polish.

In addition to the capacity, compressibility and basis weight, the non-woven substrated utilized in the present invention also must, of course, have sufficient wet strength so that the resultant product will be shelf-stable and will not disintegrate during use. The substrate must be completely compatible with the coating composition utilized so as to provide the resultant product with sufficient storage stability.

In addition to wet strength and other properties, it is desirable to utilize a non-woven substrate which has some degree of reinforcement formed in the substrate itself. By utilizing a reinforced, non-woven substrate, such as a scrim reinforced material, the structural integrity of the substrate during use in coating a floor surface is enhanced.

Furthermore, it is desirable to utilize as a substrate a material which is characterized as having a high loft, i.e., a relatively great bulk or thickness relative to the basis weight of the product since this high loft imparts desirable tactal properties to the substrate itself and provides the same with a pleasing soft hand.

As noted above, the capacity, compressibility and basis weight of the non-woven substrate affects the amount of substrate necessary to enable a certain area to be adequately coated. As the capacity of the substrate is reduced, the amount of surface area which can be covered also is reduced. By operating within the capacities as set forth in the present invention, it is possible to utilize wiping cloths of between 60 sq. in. and 250 sq. in. to cover approximately 40 to 60 sq. ft. of floor surface. While covering this large surface area with these small area substrates, the coating across the entire surface area of the floor is substantially uniform having no discernable differences in thickness.

Of course, variances in the specific non-woven substrate can be compensated by slight changes in the floor coating formulation impregnated in the substrate. It has been determined that the combination of basis weight and capacity of the substrate with the viscosity and surface tension characteristics of the coating material produce the desired coating properties of the wipes of the present invention. It has been found that as the viscosity of the coating composition increases the composition is extruded from the towel but, because of the high viscosity, is unable to again re-enter the towel during application and, accordingly, a thicker less level film on the floor surface results. Likewise, those materials which have a very high surface tension also are not suitable since they adversely affect the wetting and leveling properties of the coating on the floor. As the surface tension is lowered, of course, the material will more readily flow out of the towel onto the floor surface. However, if the surface tension is too low, the substrate will not properly meter the coating composition.

As is apparent, the relationship between viscosity and surface tension of the coating composition and the capacity, basis weight and the capillary characteristics of the substrate material control determine the metering effects and performance characteristics of the wipes of the present invention.

Although the non-woven substrates utilized in the present invention can be formed from any material normally utilized to produce non-woven textile substrates, it is preferred that the materials be formed from primarily, i.e., contain more than 50% by weight cellulosic natural derivatives such as paper pulp or cotton or other vegetable fibers. These substrates may be prepared and formed into non-woven substrates by a variety of methods.

A particularly preferred highly absorbant, high loft non-woven substrate is believed to be currently available only from Scott Paper Co. of Philadelphia, Pa., and is referred to as High Loft Brand 3000-J series paper. It is believed that this paper is made by a unique process and has unique properties.

In the past, there has been extensive activity in the field of papermaking to discover ways of imparting softness to paper webs without degrading their strength. Paper webs are conventionally softened by working them in different ways, such as by creping them from a drying surface with a creping blade. Such a process disrupts and breaks many of the interfiber bonds in the paper web which are formed during the drying thereof by the hydrogen bonding process associated with papermaking. However, these interfiber bonds are the principal source of stength in an ordinary paper web. Very little strength results from the physical entanglement of the fibers since papermaking fibers have such an extremely short length, generally of the order of 1/16 inch or less.

Attempts to improve this situation have involved the creping of webs in only selected spaced-apart areas over its surface, such as by creping with a notched or serrated creping blade, or creping from a discontinuous surface such as a circumferentially grooved roll, leaving the portions therebetween with substantially all of their strength. However, such creping patterns necessarily created lines of weakness through the sheet so that the ultimate sheet was not very strong at least in certain directions.

One of the characteristics of a sheet product which gives the semblance of strength is the toughness of the sheet. In essence, this is representative of a combination of the tensile strength of the sheet and the ability of the sheet to stretch. Obviously, if the sheet can absorb some work imposed upon it by stretching so as to avoid firmly resisting the full force applied, the resulting web appears subjectively to be stronger. It has long been known to crepe webs in various ways to create stretch and, accordingly, to impart toughness. However, even webs which have been creped in one direction, or in several different directions so as to impart universal or isotropic stretch, are weakened by the creping, and accordingly, do not have as much strength as desirable.

In the field of non-woven webs which generally include substantial amounts of fibers having a length greater than ¼ inch, it has been common practice to apply bonding material to spaced portions of the web so that fibers in at least portions and perhaps in a network across the web become bonded together to impart strength to the web. However, the fibers in such non-woven webs are sufficiently long to enable small amounts of adhesive to impart substantial strength to the web since any two adjacent areas of adhesive application can be quite far apart and yet be able to bond one fiber into a network.

It has often been thought that to apply bonding material to a paper web (as distinct from the typical non-woven webs) to impart strength thereto would result in harsh areas in the sheet which would destroy any feeling of softness which is desirable. In addition, in view of the extremely short length of papermaking fibers, it has been felt that the amount of bonding material and the large percentage of the overall area of the sheet which would have to be impregnated to impart any strength to the sheet would result in a very hard sheet, having little or no stretch and poor softness characteristics.

The substrate used in the impregnated wiper of this invention, however, is made by an apparently unique method believed to have been developed by Scott Paper Company. The method involves applying a bonding material to a paper web to impart strength thereto without impairing the softness thereof and, furthermore, increasing the bulk of such a web to give it substantial compressibility and imparting stretchability in all directions in the plane of the web. This method enables softer and bulkier webs to be formed and utilized than was heretofore possible in view of the addition of substantial strength to the web by the bonding material.

The formation of such webs is initiated in a fairly conventional manner on a papermaking machine, except that steps must be taken to weaken the interfiber bonding. This may be done by chemical means such as treating the fibers with a chemical debonder to reduce the interfiber bonding capacity thereof, or by mechanical means such as by 1) using conditions of reduced pressing during web formation to reduce the amount of interfiber bonding in the web, 2) creping the web to weaken interfiber bonding, 3) needling or 4) embossing. Some of these debonding measures are taken during web formation while others are taken after web formation. Other methods may also be employed. In each case, the resulting webs are characterized by very little interfiber bonding strength, and by increased bulk and compressibility.

After such interfiber strength is reduced, this weakness is overcome by application, to at least one side of the web, of a bonding material thereto in a fine pattern. "Fine pattern" refers to a repeating unit size of no more than about ¼ inch in any direction, and normally much smaller. Thereafter, the web may be, and preferably is, creped, thereby softening the surface to remove the harshness normally experienced due to bonded web portions. Such creping also substantially increases the bulk and compressibility of the web, which is most helpful in the holding of the composition used in this invention, and in the unique metering of the composition used. In addition, such creping shortens only such bonded portions of the web in a manner causing buckling or puffing of unbonded areas of the web so that stretch in all directions in the plane of the web is achieved.

The substrate used in this invention is a fibrous sheet material having stretch in all directions in its own plane. The substrate has a basis weight of at least about 40 g./m.$^2$, and preferably from about 40 to 190 g./m.$^2$ and most preferably 65 to 130 g./m.$^2$. The substrate is a cellulosic material which, with interfiber bonding strength being reduced (such as by initial creping), a bonding material is applied to at least one surface and preferably both surfaces in a fine pattern to form bonded web portions of greater strength than adjacent portions not containing the bonding material. The substrate used in this invention also is characterized by substantial compressibility which has been imparted to the web. "Substantial compressibility" means that degree of compressibility typically imparted by mechanical and/or chemical means, such as by creping, needling, chemical debonding and the like. It is highly preferred to utilize a web of the type described which was creped after the aforementioned fine pattern of debonding material has been applied, to give excellent softness and bulk. The substrates used in this invention will typically have a liquid capacity of about 600% by weight, dependent on many factors. The substrate should have a liquid capacity of at least about 200% by weight.

Preferably, the web to which the bonding material is applied is comprised entirely of relatively short fibers, that is, those having a length of less than ¼ inch and predominantly shorter, such as cellulosic fibers like wood pulp or cotton linters used in papermaking. However, relatively high percentages of longer fibers may be utilized without losing the advantages of the present invention, and up to 50% by weight of the fibers may have a length of up to 2-½ inches and may comprise any of the natural textile length fibers, such as cotton or wool, or the synthetic textile length fibers such as regenerated cellulose, rayon, cellulose ester fibers such as cellulose acetate fibers, polyamide fibers, acrylonitrile fibers, polyester fibers, vinyl fibers, protein fibers, fluorocarbon fibers, dinitrile fibers, nitrile fibers, and others. It is, of course, essential that the fibers used in the substrate be compatible with the composition impregnated therein.

Figure 3:
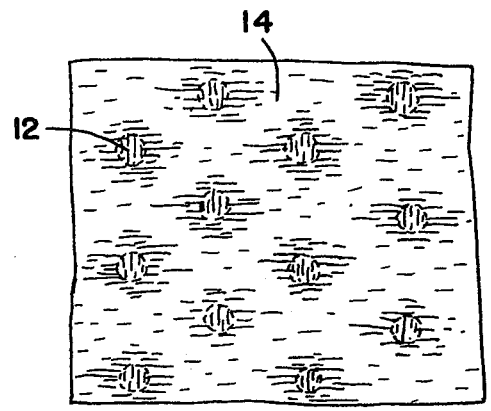

The pattern of bonding material applied to the web can be in any form which leaves a substantial portion of the surface of the web free from bonding material. For example, the bonding material may be applied in a discontinuous predetermined intermittent pattern of discrete solid areas, as shown in FIG. 3. Most preferably the pattern comprises less than 35% of the total surface area of the web so as to leave 65% or more of the surface of the web free from bonding material, at least when print bonded. In FIG. 3, bonded areas are represented by numeral 12. The lighter surrounding areas 14 are unbonded.

Figure 2:
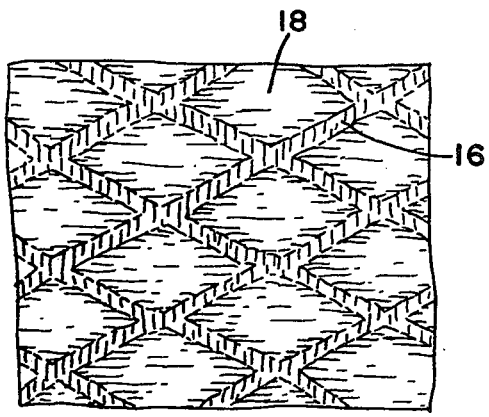
FIGS. 2–4 are greatly enlarged planar views of the surface of three forms of preferred substrates usable in the present invention.
Figure 4:
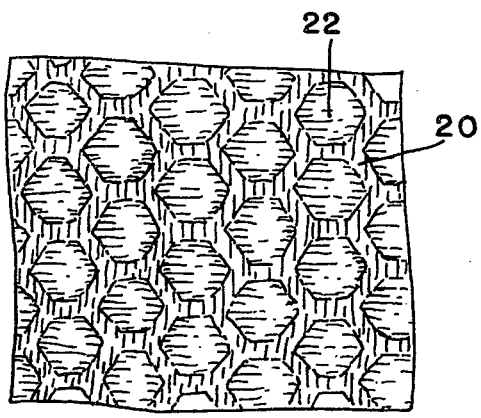

A variety of other patterns could be used. FIG. 2 illustrates a crisscross pattern, having bonded areas 16 and unbonded areas 18. FIG. 4 illustrates a honeycomb pattern having bonded areas 20 and unbonded areas 22.

Application and post-application migration of bonding material must leave areas comprising a substantial portion of the web free from any bonding material, for purposes which will become apparent subsequently.

It has been found to be particularly desirable to apply the bonding material in a continuous predetermined reticular pattern so that the bonding material forms a net-like web of strength over the web. FIGS. 2 and 4 are examples. It is well-known that papermaking fibers generally have a length less than ¼ inch and normally have a predominant fiber length less than 1/16 inch in length. Therefore, when strength is to be primarily imparted to the sheet by a bonding material, instead of by interfiber bonds of the type conventionally utilized in papermaking, it is desirable that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than average fiber lengths or, typically, less than 1/16 inch. However, where the pattern of adhesive is reticular or net-like in configuration, the interconnected lines of bonding material application provide a network of strength even where substantial areas, in many cases larger than 1/16 inch in every direction, are defined between the lines of bonding material application as discrete unbonded web portions.

Bonding material may be applied either to one or both of the web surfaces. In some cases, a laminated web, having bonding material applied at the interface (by application to one surface of one of the layers), may be used in this invention. The fine pattern of bonding material becomes, in effect, the bonding material holding the laminated web together.

The bonding material used in preparing the cellulosic substrate used in this invention must be compatible (not soluble in or reactive with) the composition used. Furthermore, the bonding material must be capable of securely bonding the web fibers one to another. Among the bonding materials which are capable of accomplishing both of these functions and which can be successfully used are acrylate latex rubber emulsion, emulsions of resins such as acrylates, vinyl acetates, vinyl chlorides, methacrylates, and co-polymers thereof, and co-polymers of carboxy methyl cellulose or polyacrylamide. In other instances, the bonding material may comprise a mixture of several materials. Bonding materials, of course, must be compatible with the composition used with the substrate. Suitable bonding materials will be known to those skilled in the art.

These substrates will have substantial strength, including excellent wet strength with the impregnants used in this invention, even over long periods of time, such as in storage.

In addition to the laminated materials mentioned above, reinforced-type substrates may be used in this invention. Reinforced substrates suitable for this invention would be obvious to those skilled in the art who are familiar with this invention.

A specific example of a substrate usable in this invention is formed as follows. A web is formed from a fiber furnish consisting of 70% by weight of a bleached softwood pulp, and 30% by weight of a bleached hardwood pulp, using a conventional papermaking machine. The web is wet creped as it comes off a dryer roll of the conventional papermaking equipment, and then dried further until about 92% dry. A bonding material comprising a water solution of (by weight) 5% tapioca dextrin, 3% carboxy ethylene vinyl acetate co-polymer, 1% propylene glycol, 0.1% formalin, and 0.1% fluorescent dye is print applied to one side of the web in the fine pattern shown in FIG. 4. The web is printed in a nip formed by a patterned gravure roll having a diameter of 14 inches and an elastomer roll having a diameter of 14 inches and a 5/8 inch neoprene cover of a hardness of 78 Shore "A" durometer. The gravure roll surface has a recticular pattern of interconnected hexagons having two of their sides perpendicular to the machine direction and a pattern repeat length of 0.030 inch. The engraved lines of the pattern comprise approximately 40% of the overall surface area. The pressure in the printing nip is controlled at about 150 psig. Prior to drying of the bonding material the web is applied to the surface of a cast iron creping drum having a Brinell hardness of 277 and a diameter of 5 feet by means of an elastomer roll with an average nip pressure against the creping drum of 137 psig. The creping drum is steam heated to a surface temperature of 220°F, and the drum surface speed is 1500 ft./min. As the web is pressed to the drum, the average dryness is about 75%, and before leaving the creping drum, the web has an average dryness of about 95%. The sheet is creped from the surface of the creping drum, to which it has adhered, by a conventional creping doctor blade set at a creping shelf angle of 11° below the radial line at the point of contact.

The above substrate materials may be impregnated by any conventional impregnation technique with from 3.0 to 6.5 times the weight of the non-woven substrate with an aqueous self-polishing floor coating composition. These compositions may be of substantially any general type, such as emulsion, alkali-soluble or solution types, so long as the composition has proper viscosity and surface tension properties to be properly and evenly dispensed from the substrated described above.

Although the specific viscosity and surface tension of a floor coating composition will affect the manner in which it is dispensed from the non-woven substrates, variations in formulation can further modify the actual effect, although not modifying the measured value of the physical property. Generally, the floor coating compositions should have a Brookfield viscosity within the range of from 3 to 20 centipoises for emulsion systems and from 3 to 40 centipoises for solution systems. The preferred viscosity ranges for coating compositions is within the range of from 5 to 10 centipoises for within this range it has been found that maximum performance is obtained both with regard to leveling over the entire surface area and flow or dispensing out of the non-woven substrate.

With regard to the surface tension, again a number of factors will influence the effect of the surface tension or observed surface tension; however, it is preferred that in order to properly wet and level the floor surfaces the compositions have a surface tension of from 20 to 40 dynes per centimeter.

In addition to the viscosity and surface tension of the floor coating compositions impregnated in the non-woven substrates, the performance of the floor coating wipes of the present invention will also be influenced by various other properties of the coating compositions, including solids level, level of tack of the composition during the drying stage, pH of the composition and, for solution systems, the molecular weight of the coating polymers utilized.

With regards to the amounts of solids utilized in the compositions impregnated in the non-woven substrates, it has been found that compositions having a non-volatile content of from 5 to 25 weight percent perform satisfactorily with compositions having a non-volatile content of from 10 to 16% being preferred and 12 to 14% being most preferred. At the lower non-volatiles, i.e., from 10 to 16%, the gloss characteristics of the resultant film are quite high while at the same time the performance characteristics, i.e., durability, black heel mark resistance, etc., are not reduced or adversely affected. At higher non-volatiles the film thickness is often increased which adversely affects the mileage or total coverage of the product and the leveling of the coating on the floor.

The coating compositions of the present invention, since they are designed to be utilized and applied by hand, should have a pH in the range of from about 7.0 to about 10.0 so as to limit and reduce any adverse dermal or other reactions which might occur as well as to insure optimum performance. Furthermore, for emulsion systems at pH's within the above noted range and preferably within the range of from about 7.5 to about 9.6 preferred performance characteristics are observed, such as reduced tack and improved stability. With regard to solution and alkali-soluble polymer systems, a pH of from 7.5 to 9.6 is preferred since in this range not only is a new coating placed on the floor but also the floor wipe of the present invention exhibits improved cleaning performance.

Although the molecular weight of the polymers utilized in forming the film-forming coatings impregnated in the non-woven substrates utilized in the present invention is not generally critical, it found that, if a solution system is used, polymers having a weight average molecular weight within the range of 500 to 40,000, preferably between 2,000 and 10,000, and most preferably 6,000 to 8,000 produce coating compositions having the desired combination of durability, ease of application and gloss. Furthermore, it has been found that the relationship between the weight average and number average molecular weight also affects performance and has been found that preferred compositions utilizing the floor coating wipes of the present invention have a weight average molecular weight over number average molecular weight ratio of 2 or less. Also, it is preferred to use solution polymers having a reasonably high acid number.

Lastly, as noted above, the floor coating compositions can either be in emulsion, alkali-soluble or solution form. While either emulsion, alkali-soluble or solution systems will adequately form coatings on the floor surfaces, the performance of solution systems do not appear to be as viscosity dependent as alkali-soluble and emulsion systems. However, with regard to the level of tack produced on the consumer's hands during use, it appears that emulsion systems, i.e., those systems wherein the polymeric coating agents are dispersed in an emulsion, appear to have less tack on the consumer's hands.

Although as noted above the specific composition of various floor coating compositions is not critical to the performance of the floor wipes of the present invention so long as the basic parameters set forth above are met, it has been found that most useable floor polish compositions include from 5 to 18% by weight of a film-forming polymeric coating agent; from 1 to 10% by weight of a wax, this wax being selected from natural wax emulsions and emulsions of polyethylene and polypropylene waxes.

These floor coating compositions also include various other materials, such as leveling agents, plasticizers, solvents, surfactants, pH modifying agents and perfumes and other materials in small amounts.

Generally, these emulsions and solutions are aqueous and are formed by combining the above classes of materials in appropriate amounts to produce the desired non-volatile content of the composition.

Examples of some emulsion and alkali-soluble floor coating compositions which may be suitable are found in U.S. Pat. Nos. 3,308,078 and 3,320,196, which are incorporated herein by reference.

Examples of solution coating compositions suitable for use in the wipe of the present invention are disclosed in U.S. Ser. No. 480,981, filed June 19, 1974, directed to improved floor coating compositions having from 4 to 20% non-volatiles herein incorporated by reference. These compositions comprise 50–96% by weight water, 0–10% by weight plasticizer, 0–5% by weight leveling agent, 0–10% by weight organic solvent, 0–5% by weight surfactant, 0–15% by weight wax, 0–10% by weight film-modifying polymer, 3–18% by weight of a polymeric coating comprising a solution of an alkali-soluble resin having a weight average molecular weight from about 500 to 40,000 and an acid number from about 120 to 550, this resin being an addition resin formed from 40–85% of at least one ethylenically unsaturated ligand-free monomer such as vinyl toluene, methyl methacrylate, butyl methacrylate, acrylonitrile, vinyl acetate, stryene, α-methyl styrene, butyl acrylate, ethacrylate, 2-ethylhexyl acrylate and mixtures and 60 to 15% of an ethylenically unsaturated monomer having at least one acid group such as acrylic, methacrylic, crotonic, isocrotonic, maleic, fumaric, itaconic acids and anhydrides of these acids, as well as mixtures thereof, and sufficient ammonia to provide a pH of at least 7.5. The combined non-volatiles of the leveling agent, solvent, plasticizer, surfactant, wax and film-modifying polymer are equal to or greater than 9% of the non-volatiles of the polymeric coating resin.

The floor wipe compositions of the present invention may be produced by a variety of conventional impregnation techniques, such as compressing a stack of prefolded textile substrates to a desired thickness and allowing the same to expand while in contact with the floor coating composition. Other conventional impregnation techniques, such as dipping, spraying and other pressure impregnation processes, may also be utilized.

The non-woven impregnated wipes of the present invention may be also packaged for use in a number of conventional type containers so long as these containers are sufficiently airtight during storage so as to prevent the impregnated wipe from becoming dried. Examples of these containers include individually foil wrapped packets and various bulk packs having recloseable airtight seals.

The floor coating wipes of the present invention will now be described by way of the following attached example wherein all parts and percentages are by weight and all temperatures are in degrees Centigrade.

EXAMPLE 1

A 13 ⅓ by 12 inch non-woven substrate having a basis weight of 93 g/m² and having high loft and a liquid capacity of about 6.4 available from Scott Paper Company weighing 8.6 grams was impregnated with 45 grams of the following aqueous emulsion floor composition:

| | |
|---|---|
| Polymer* | 25.20 |
| SAA Resin** | 14.00 |
| Polyethylene Wax Emulsion (25%) | 3.36 |
| Polypropylene Wax Emulsion (27.5%) | 1.00 |
| Tributoxyethyl Phosphate | 1.26 |
| Carbitol | 4.00 |
| Formaldehyde | 0.20 |
| Fluorocarbon 3611 (1%) | 1.00 |
| Perfume | 0.10 |
| Water | 49.88 |
| | 100.00 | pH = 7.8
Non-volatiles = 14%
*35% emulsion polymer having approximately 10,000 weight average molecular weight formed from 25% styrene, 33% methyl methacrylate, 30% butyl acrylate and 12% methacrylic acid using 1.5 BMPA chain transfer agent.
**20% solution of low molecular weight resin having 67% styrene and 33% acrylic acid.

The above impregnated wipe was used to clean and shine a slightly soiled well-maintained vinyl asbestos floor and covered approximately 45 sq. ft. There was no discernable difference in the thickness of the coating over the entire surface area coated with the entire area leveling well and having a high degree of gloss.

EXAMPLE 2

The same non-woven substrate used in Example 1 is impregnated with the following solution floor coating composition:

| | |
|---|---|
| SAA Resin* | 58.80 |
| Polyethylene Wax Emulsion (25%) | 1.68 |
| Polypropylene Wax Emulsion (27.75%) | 0.51 |
| Tributoxyethyl Phosphate | 0.60 |
| Octophenol + 40 ethylene oxides nonionic surfactant | 0.69 |
| Fluorocarbon 3611 | 0.04 |
| High Purity Oleic Acid | 0.60 |
| 28% Ammonium Hydroxide | 0.32 |
| Perfume | 0.10 |
| Water | 36.66 |
| | 100.00 | pH = 9.0
Non-volatiles = 14%
*67% styrene, 33% acrylic acid, resin cut having 20% solids in ammonium hydroxide, carbitol and water.

When applied to a floor surface at a 5 to 1 loading, i.e., 45 grams on the towel, this product covered approximately 55 sq. ft. of surface area with a substantially uniform coating having high gloss and good leveling.

EXAMPLE 3

The composition of Example 2 is utilized to impregnate at a 5 to 1 loading ratio a towel similar to that utilized in Example 1 except that the basis rate is 129 g/m² with a liquid capacity of about 8.2 times its weight. This towel is impregnated with 55 grams of product and effectively coats 55 sq. ft. having substantially uniform gloss and leveling characteristics.

EXAMPLE 4

Example 3 was repeated with the exception of that the 129 g/m² non-woven was replaced with a 58 g/m² non-woven having a liquid capacity of 4.0 and 27 grams of floor coating composition was impregnated to give a 5 to 1 load rate. This lighter towel was able to cover from 35 to 40 sq. ft. of surface and produced substantially uniform gloss and leveling.

EXAMPLE 5

A 15 ½ by 12 ½ inch non-woven substrate having a basis weight of 68 to 72 g/m² having a liquid capacity of about 5.4 times its weight and having a nylon scrim reinforcement weighing approximately 10 grams was impregnated with 45 grams of the following alkali-soluble floor coating composition:

| | |
|---|---|
| Polymer* | 9.26 |
| Styrene Acrylic Acid Resin** | 28.80 |
| Tributoxyethyl Phosphate | 0.60 |
| Carbitol | 0.88 |
| Oleic Acid | 0.60 |
| Octophenol + 40 EO nonionic surfactant | 0.69 |
| Polyethylene Wax Emulsion (20%) | 1.80 |
| Fluorocarbon 3611 | 0.20 |
| Polyethylene Wax Emulsion (25%) | 1.92 |
| Zinc Ammonium Carbonate | 0.80 |
| Ammonium Hydroxide | 1.20 |
| Perfume | 0.10 |
| Water | 53.33 |
| | 100.00 | pH = 9.6
Non-volatiles = 12%
*An emulsion polymer having a weight average molecular weight of approximately 11,000 formed from 10% styrene, 46% methyl methacrylate, 30% butyl acrylate, 14% methacrylic acid utilizing BMPA as a chain transfer agent.
**20% solution of 67% styrene, 33% acrylic acid low molecular weight resin.

The foregoing alkali-soluble resin, when impregnated in the non-woven substrate covered approximately 45 sq. ft. of floor having good gloss and leveling characteristics and producing a substantially uniform coating.

The foregoing examples are for the purposes of illustration only and should be not construed as limiting the subject matter of the present invention which is properly defined by the appendant claims.

What is claimed is:

1. A packaged disposable floor wipe adapted to apply a substantially uniform coating of an aqueous coating composition to a floor comprising in combination a flexible non-woven substrate which substrate is substantially compressible having a basis weight within the range of from 40 g/m² to 190 g/m², has a bonding material penetrated into at least 1 surface of said substrate in a fine pattern to form bonded web portions of greater strength than adjacent portions non containing said bonding material, said pattern comprising less than 35% of the total surface area of the web to give said substrate substantial wet strength, and having a liquid capacity sufficient to absorb from 4 to 10 times the weight of said substrate of water and an aqueous floor coating composition selected from emulsion coatings, alkali-soluble coatings and solution coatings, said coating composition having from 5 to 25% non-volatiles, a pH of from 7.0 to 10.0 and including from 5 to 18% by weight of a film-forming polymeric coating agent said coating composition impregnated in said non-woven substrate at a loading of from 3.0:1 to 6.5:1.

2. The disposable wipe of claim 1 wherein said coating composition is an emulsion coating.

3. The disposable wipe of claim 1 wherein said coating composition is a solution coating.

4. The disposable wipe of claim 1 wherein said coating composition is an alkali-soluble coating.

5. The disposable wipe of claim 1 wherein said substrate includes a reinforcng scrim.

6. The disposable wipe of claim 1 wherein said substrate is formed from at least 50% by weight cellulosic materials.

7. The disposable wipe of claim 6 wherein said coating composition is an emulsion coating.

8. The disposable wipe of claim 6 wherein said coating composition is an alkali-soluble coating.

9. The disposable wipe of claim 6 wherein said coating composition is a solution coating.

10. The disposable of claim 9 wherein said solution coating composition comprises from 50–96% by weight water, 0–10% by weight plasticizer, 0–5% by weight leveling agent, 0–10% by weight organic solvent, 0–5% by weight surfactant, 0–14% by weight wax, 0–10% by weight film-modifying polymer, 3–18% by weight polymeric coating agent comprising a solution of an alkali-soluble resin having a weight average molecular weight of from about 500 to 40,000 and an acid number of from about 120 to 550, this resin being an addition resin formed from 40–85% by at least 1 ethylenically unsaturated ligand-free monomer and 60–15% by weight of ethylenically unsaturated monomer having at least 1 acid group; and sufficient ammonia to provide a pH of at least 8.0 with the proviso that the combined non-volatiles of the leveling agent, solvent, plasticizer, surfactant, wax and film-modifying polymer are equal to or greater than 9% of the non-volatiles of the polymeric coating resin.

11. The disposable wipe of claim 6 wherein said substrate has a basis weight of from 65 g/m$^2$ to 130 g/m$^2$.

12. The disposable wipe of claim 11 wherein said coating composition is an emulsion coating.

13. The disposable wipe of claim 11 wherein said coating composition is a solution coating.

14. The disposable wipe of claim 11 wherein said coating composition is an alkali-soluble coating.

15. The composition of claim 11 wherein said solution coating composition comprises from 50–96% by weight water, 0–10% by weight plasticizer, 0–5% by weight leveling agent, 0–10% by weight organic solvent, 0–5% by weight surfactant, 0–14% by weight wax, 0–10% by weight film-modifying polymer, 3–18% by weight polymeric coating agent comprising a solution of an alkali-soluble resin having a weight average molecular weight of from about 500 to 40,000 and an acid number of from about 120 to 550, this resin being an addition resin formed from 40–85% by at least 1 ethylenically unsaturated ligand-free monomer and 60–15% by weight of ethylenically unsaturated monomer having at least 1 acid group; and sufficient ammonia to provide a pH of at least 8.0 with the proviso that the combined non-volatiles of the leveling agent, solvent, plasticizer, surfactant, wax and film-modifying polymer are equal to or greater than 9% of the non-volatiles of the polymeric coating resin.

* * * * *

UNITED STATES PATENT OFFICE
CERTIFICATE OF CORRECTION

Patent No. 3,965,519                    Dated   June 29, 1976

Inventor(s)   James F. Hermann

It is certified that error appears in the above-identified patent and that said Letters Patent are hereby corrected as shown below:

Column 2, line 40, "compessibility" should be --compressibility--.

Claim 1, line 9, "non" should be --not--.

Claim 5, line 2, "reinforcng" should be --reinforcing--.

Signed and Sealed this

Second Day of November 1976

[SEAL]

Attest:

RUTH C. MASON
*Attesting Officer*

C. MARSHALL DANN
*Commissioner of Patents and Trademarks*